United States Patent Office 3,360,331
Patented Dec. 26, 1967

3,360,331
PROCESS FOR PREPARING A LEAD TITANATE CATALYST
William H. Manogue, Newark, Del., assignor to E. I. du Pont de Nemours and Company, Wilmington, Del., a corporation of Delaware
No Drawing. Filed Oct. 15, 1963, Ser. No. 316,461
1 Claim. (Cl. 23—51)

The present invention relates to lead titanate catalysts, and more particularly to a method of preparing lead titanate catalysts having improved performance when employed to catalyze the reaction of propylene and nitric oxide to form acrylonitrile.

The synthesis of acrylonitrile by the reaction of propylene and nitric oxide at a temperature of 400° to 700° C. over a silver-on-silica catalyst is described in U.S. Patent 2,736,739. As disclosed therein, this reaction gives acrylonitrile in conversions up to about 12%. More recently, it was discovered in small-scale experiments that lead titanate catalysts are considerably more active than the silver-on-silica catalyst in the aforementioned propylene-nitric oxide reaction. I have now found a way to make the lead titanate catalysts even more useful.

A convenient way of making lead titanate for catalyst use is by heating a mixture of lead oxide (PbO) and titanium dioxide (or compounds convertible to the oxides) at a temperature within the range of about 350° C. to about 750° C., preferably from about 550° C. to about 650° C., for a period of time which varies depending on the temperature used, two hours' heating usually being satisfactory in the preferred temperature range. Other compounds of lead and titanium can be used as the starting materials instead of the oxides and thus are equivalents for the purposes of this invention. For example, oxygen-containing lead compounds which are converted to lead oxide upon calcination can be used, such as the higher oxides of lead ($Pb_2O_3$, $Pb_3O_4$, and $PbO_2$), lead hydroxide, lead carbonate, lead nitrate, lead subacetate, and others. In addition to the oxides and hydroxides of titanium, the chloride or nitrate can be used, or the organic titanates. Lead titanate catalysts which have been found to have activity in the propylene-nitric oxide reaction consist essentially all of lead titanate ($PbTiO_3$), or they can additionally contain uncombined lead oxide and/or titanium dioxide. For use in unsupported form the catalysts are pelleted or extruded either prior or subsequent to heating. Alternatively, the catalyst may be extended on a support material by any one of various techniques.

I have now found a way of modifying the lead titanate compositions prepared as described above to improve their performance as catalysts for the formation of acrylonitrile from propylene and nitric oxide. The improvement is especially manifested in higher cumulative yield, and in decrease in the rate of carbon deposition on the catalyst.

According to this invention the lead titanate is modified by contacting it with a dilute aqueous solution of phosphoric acid or of hydrochloric acid, specifically an aqueous solution having a concentration of from about 0.001% to about 0.1% by weight of phosphoric acid or from about 0.001% to about 0.5% by weight of hydrochloric acid. Analytical data establish that such treatment causes deposition of ions from the acid onto the catalyst, as opposed to removal of ions.

The amount of acid solution employed in the present process is not critical to the process. Preferably at least sufficient liquid is used to saturate or soak the entire amount of catalyst to be treated. Normally 100 milliliters of solution per 100 grams of catalyst composition is sufficient, but much more or less can be used as desired.

Any convenient method for contacting the acid solution with the catalyst can be used. All that is needed is that the solid be wetted, preferably thoroughly wetted. This can be done by simply pouring the catalyst into a body of the liquid or by adding the liquid to the solid, with or without agitation. Alternatively the acid solution can be sprayed onto the catalyst. In this manner of operation, the catalyst can be treated in the reactor where it is to be used. Washing of the catalyst is unnecessary after treatment with the acid solution.

The present process can be effected at room temperature as well as at elevated temperatures, e.g., at or near the boiling point of the solution used. Temperature has no critical effect on the performance of the treated catalyst, but higher temperatures tend to increase the rate of diffusion of the liquid through the catalyst. The time of contact between the acid and the catalyst is not critical. Generally, a contact time of about five minutes is sufficient to effect ion deposition, but to assure maximum benefit a contact time of about fifteen minutes or more is used, depending on the temperature, volume of liquid used, the presence or absence of agitation, porosity of the catalyst, etc.

The following examples serve to illustrate specific embodiments of the process of the present invention and the effect of this process on the performance of the catalyst prepared thereby, as judged specifically from the results achieved when said catalyst is used in the preparation of acrylonitrile by the vapor-phase reaction of propylene and nitric oxide. Conversion and yield data appearing in the examples are based on moles of nitric oxide as the limiting reactant. The calculations of conversion and yield are based on the following reaction stoichiometry:

$H_2C=CH-CH_3 + 1.5NO \rightarrow$
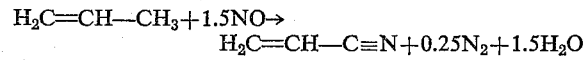
$H_2C=CH-C\equiv N + 0.25N_2 + 1.5H_2O$ The term "conversion," as used herein, means the ratio of moles of acrylonitrile obtained to moles theoretically obtainable from the moles of nitric oxide fed to the reactor. "Yield" means the ratio of moles of acrylonitrile obtained to moles theoretically obtainable based on the moles of nitric oxide consumed in the reaction (i.e., the moles of nitric oxide fed to the reactor less the moles of unreacted nitric oxide recovered). "Average cumulative conversion" and "average cumulative yield" mean the average conversion and yield obtained over a certain number of evaluation hours.

The lead titanate catalysts employed as the starting materials in the examples are prepared according to the following procedure:

Equal quantities by weight of powdered lead oxide (PbO) and titanium dioxide (anatase) are mixed intimately for a period of about two hours. An aqueous solution of polyvinyl alcohol is blended into the mixture so as to form aggregates. The aggregate mixture is dried to a certain moisture content, and then pelleted or extruded in the desired size. The pelleted or extruded material is calcined at about 600° C. for 2 hours.

Example 1

A lead titanate catalyst prepared as described above in the form of 5/32-inch pellets is introduced into a refluxing solution of 0.01% (by weight) aqueous phosphoric acid, and the catalyst is maintained in contact with the solution for 2 hours. About 100 milliliters of solution is employed per 100 grams of catalyst. Thereafter, the catalyst is removed from the solution, washed with hot water, and dried by heating at 125° C. to achieve a moisture content below 1% by weight. The solution is analyzed colorimetrically and is thereby found to have a phosphoric acid concentration of less than 0.0003%.

To evaluate the effectiveness of the phosphoric acid treatment, the performance of the treated catalyst is compared with that of the untreated catalyst in the vapor-phase reaction of propylene and nitric oxide. The catalyst is packed into a tubular reactor operating at a temperature of 495° C. to 505° C., and a gaseous mixture of 64% of nitrogen, 9% of nitric oxide, and 27% of propylene (all by volume) is passed at 8 p.s.i.g. pressure through the catalyst bed. The feed rate and the bed volume is such that the contact time falls within the range of from 0.1 to 10 seconds. Over a period of 31 hours' use in the reactor, the phosphoric acid treated catalyst gives a 17% higher average cumulative yield, a 13% higher average cumulative conversion, and a 30% higher average mole ratio of acrylonitrile to acetonitrile by-product than does the same catalyst without phosphoric acid treatment employed under the same conditions of temperature and contact time as the treated catalyst.

When the same procedure is repeated except that a 0.2% phosphoric acid solution is used, there is a 6% improvement in average cumulative yield and a 140% improvement in acrylonitrile/acetonitrile mole ratio, but the treated catalyst gives only about 45% of the average cumulative conversion given by the untreated catalyst. Thus, 0.2% phosphoric acid solutions are not desirable since they sharply reduce the catalyst activity although they improve selectivity.

*Example 2*

The lead titanate catalyst described in Example 1 is treated at 95° C. with a 0.01% aqueous phosphoric acid solution for 0.5 hour. After separation of the catalyst and solution, the catalyst is used, without washing, in the reaction described in Example 1. Over a period of 109 hours' use, this treated catalyst gives a 14% higher average cumulative yield, a 13% higher average cumulative conversion, a 10% higher average acrylonitrile/acetonitrile mole ratio, and 50% less carbon deposition per hour than does the same lead titanate catalyst prior to treatment.

*Example 3*

The procedure of Example 1 is repeated except that the solution used has a concentration of 0.001 weight percent of phosphoric acid, and the solution and catalyst are maintained in contact with each other for 1 hour. After separation from the solution, the catalyst is washed by rinsing and soaking with cold water. When used in the reaction described in Example 1, this phosphoric acid treated catalyst gives, over a period of 81 hours, a 14% higher average cumulative yield, an 11% higher average cumulative conversion, and 33% less carbon deposition per hour than does the same lead titanate catalyst prior to treatment. The solution, after treatment of the catalyst therewith, has a phosphoric acid concentration of less than 0.0003%.

*Example 4*

A lead titanate catalyst is prepared in the form of pellets as described in the paragraph preceding Example 1. The calcined pellets then are ground into a powder to a size such that the particles are held on a 100-mesh screen. The powdered catalyst then is soaked for 0.5 hour in a 0.04% (by weight) solution of hydrochloric acid at room temperature. About 67 grams of catalyst is used per 100 milliliters of solution. After draining off the solution, the catalyst is dried in an oven at 130° C. for 1 hour. When this catalyst is employed in the reaction described in Example 1, this hydrochloric acid treated catalyst gives, over a period of 60 hours, a 9% higher average cumulative yield and a 58% higher average acrylonitrile/acetonitrile mole ratio than the same lead titanate catalyst when untreated. Average cumulative conversions obtained with the treated and untreated catalyst are approximately the same.

When the procedure of Example 1 is repeated using a 1% hydrochloric acid solution, the treated catalyst gives an 8% higher average cumulative yield, a 180% higher average acrylonitrile/acetonitrile mole ratio, and 80% less carbon deposition per hour than the untreated catalyst. However, the average cumulative conversion obtained with the treated catalyst is 19% lower than that obtained with the untreated catalyst, indicating that 1% hydrochloric acid solutions cause a decrease in activity of lead titanate catalysts.

As is seen from the foregoing examples, the process of this invention provides a means of effecting a significant improvement in the long-range performance of lead titanate catalysts in the propylene-nitric oxide reactions. Catalysts treated by the present process are seen to give significantly higher average cumulative yields, higher ratios of desired product to by-product, and lower carbon deposition rates over periods of evaluation ranging from 31 to 109 hours than do untreated lead titanate catalysts. Furthermore, the greater selectivity of lead titanate catalysts treated according to the present process is accompanied by little or no sacrifice in catalyst activity, i.e., in average cumulative conversions, and in most cases the treated catalysts are more active, i.e., give higher conversions.

The foregoing detailed description has been given for clearness of understanding only and no unnecessary limitation are to be understood therefrom. The invention is not limited to the exact details shown and described, for various modifications which do not materially change the basic character of the invention or depart from the principle or spirit of the invention will appear to those skilled in the art.

I claim:

A process for preparing a lead titanate catalyst which comprises:

(a) heating a mixture of lead oxide and titanium dioxide at a temperature of about from 350° to 750° C. to form lead titanate;

(b) contacting the resulting product with an aqueous acid solution selected from the group consisting of aqueous solution of phosphoric acid of concentration in the range of about 0.001% to about 0.1% by weight and aqueous solution of hydrochloric acid of concentration in the range of about 0.001% to about 0.5% by weight to saturate said product with said solution; and (c) drying said product.

References Cited

UNITED STATES PATENTS

| | | | |
|---|---|---|---|
| 2,140,236 | 12/1938 | Lederle et al. | 23—51 |
| 3,023,226 | 2/1962 | England et al. | 260—465.3 |
| 3,141,902 | 7/1964 | Huntley et al. | 252—461 X |
| 3,184,415 | 5/1965 | Huntley et al. | 252—461 |

OSCAR R. VERTIZ, *Primary Examiner.*

H. T. CARTER, *Assistant Examiner.*